US005224333A

United States Patent [19]

Bretz et al.

[11] Patent Number: 5,224,333

[45] Date of Patent: Jul. 6, 1993

[54] SIMPLEX AIRBLAST FUEL INJECTION

[75] Inventors: David H. Bretz, Bloomfield Township, Davis County; Darrell G. Bobzin, West Des Moines, both of Iowa

[73] Assignee: Delavan Inc, West Des Moines, Iowa

[21] Appl. No.: 825,345

[22] Filed: Jan. 24, 1992

Related U.S. Application Data

[62] Division of Ser. No. 492,774, Mar. 13, 1990.

[51] Int. Cl.$^{5}$ .......................... F02C 7/26; F02G 3/00

[52] U.S. Cl. .......................................... 60/39.06; 60/740

[58] Field of Search ............ 60/39.06, 39.141, 39.142, 60/737, 738, 740, 748

[56] References Cited

U.S. PATENT DOCUMENTS

| | | | |
|---|---|---|---|
| 3,668,869 | 6/1972 | De Corso et al. | 60/740 |
| 3,853,273 | 12/1974 | Bahr et al. | 60/748 |
| 3,886,736 | 7/1975 | Kawaguchi | 60/748 |
| 4,891,935 | 1/1990 | McLaurin et al. | 60/740 |
| 4,938,019 | 7/1990 | Angell et al. | 60/39.06 |

*Primary Examiner*—Richard A. Bertsch
*Assistant Examiner*—Howard R. Richman
*Attorney, Agent, or Firm*—Howard S. Reiter

[57] ABSTRACT

A simplex air blast fuel injection system for the atomization of fuel for ignition to drive a gas turbine includes a simplex nozzle which receives fuel from a fuel pump powered by the turbine over a range of pressures between maximum and minimum pressures during the operation of the turbine, and also receives fuel at a substantially lower pressure than the minimum fuel pressure when the turbine is cranked during startup. The fuel is discharged from the nozzle orifice as a swirling stream of atomized fuel during turbine operation, and as a film which is insufficiently atomized to initiate ignition during the turbine startup. An air compressor is also powered by the turbine to supply air at a low pressure to the fuel issuing from the nozzle orifice during both turbine operation and startup. An air director shroud imparts a swirling motion to the low pressure air and directs the swirling air to adjacent the fuel film as it issues from the nozzle orifice during startup to produce a pressure differential between opposite sides of the film to explode and atomize the fuel film sufficiently to permit ignition during turbine startup. A stream of low pressure air is also directed to the swirling stream of atomized fuel during turbine operation and that air stream is also preferably swirling.

13 Claims, 1 Drawing Sheet

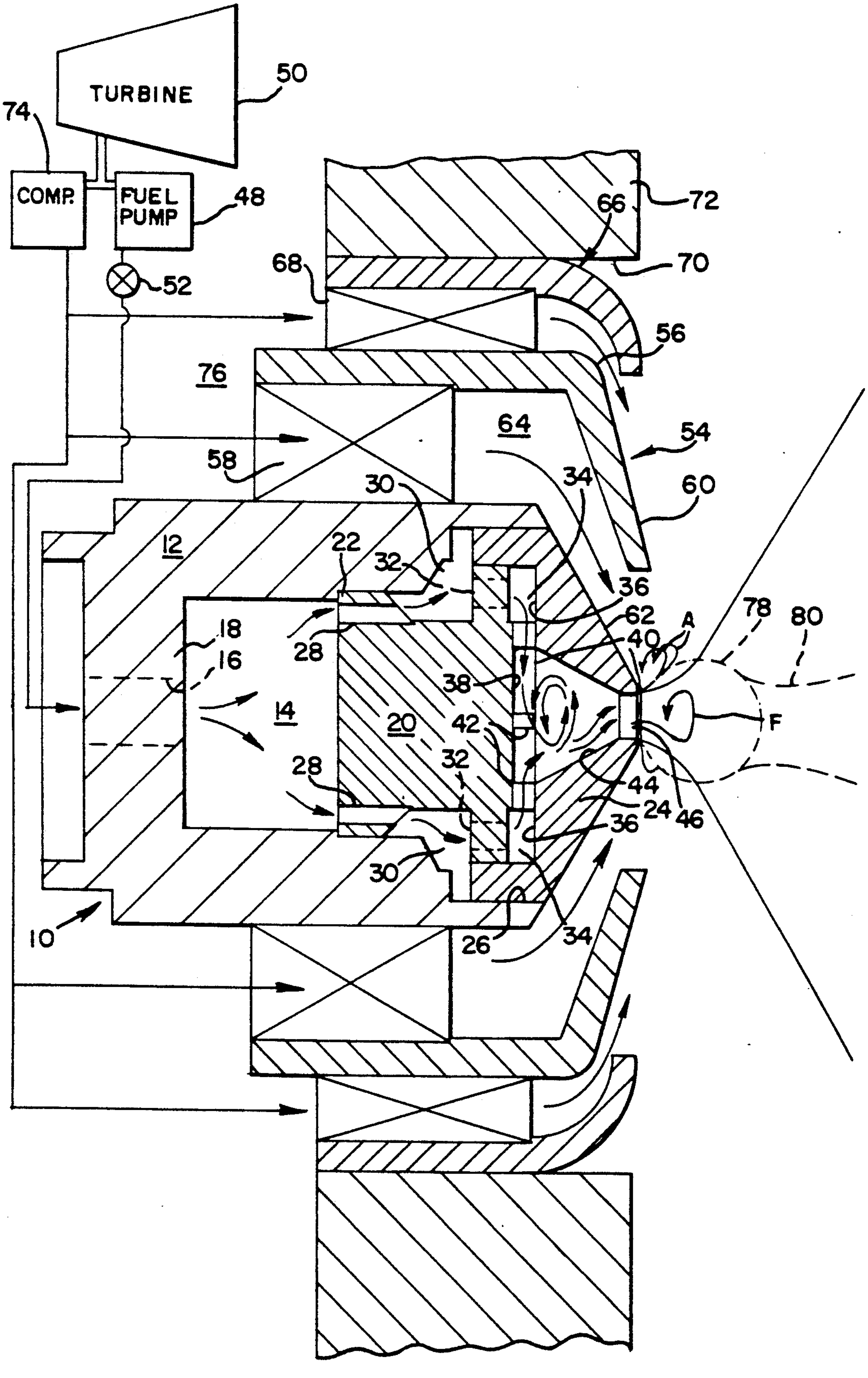
TURBINE
50
74
COMP.
FUEL PUMP
48
52
66
72
68
70
56
76
64
54
58
30
34
60
12
22
32
36
62
A
78
80
18
16
28
40
38
14
20
42
F
28
32
44
24
46
36
30
10
26
34

SIMPLEX AIRBLAST FUEL INJECTION

This application is a division, of application Ser. No. 07/492,774, filed Mar. 13, 1990.

BACKGROUND AND SUMMARY OF THE INVENTION

The present invention is directed to a simplex airblast fuel injection system and method for the atomization of fuel for ignition to drive a gas turbine and, more particularly, to such system and method which are capable of atomizing the fuel for ignition during both the startup and operation of the turbine.

A wide variety of fuel injection devices, systems and methods have been employed in the past for the atomization of fuel to support ignition and combustion for driving prime movers, such as gas turbines. These various devices, systems and methods each enjoy certain advantages, but they also suffer certain disadvantages. One common disadvantage is the difficulty of initiating fuel ignition during startup of the gas turbine. During startup the fuel must be presented in a sufficiently atomized condition to initiate and support ignition. However, the fuel and/or air pressures needed for such atomization are commonly unavailable during startup because the turbine, when it is simply being cranked at low rpm, is unable to produce sufficient fuel or air pressures which it otherwise is capable of providing in its running operating condition. Accordingly, various approaches have been taken in the past to achieve startup under these conditions. Some of these approaches are generally discussed in Arthur H. Lefebvre, *Atomization and Sprays,* Hemisphere Publishing Corp., 1989, pages 136–142.

One approach has been to provide multiple circuit fuel systems and nozzles. One circuit and nozzle are of larger capacity for handling the normal fuel flow rates and pressures up to the maximum which are encountered over the range of operating conditions of the turbine. The other circuit and nozzle are specially configured and sized to handle fuel at the substantially lower flow rates and pressures existing during turbine startup to provide sufficient atomization of the fuel to initiate ignition and the starting of the turbine. These multiple circuit and nozzle fuel systems are more expensive, contain more parts, are less reliable and add to the total overall weight and complexity of the system.

In order to avoid the need for the aforementioned additional circuits and nozzles and their attendant disadvantages, air assist atomizers have found some usage in the field. In these air assist atomizers air or steam is employed to augment the atomization process at the low fuel injection pressure levels which exist at turbine startup. In the air assist atomizers provision is made to supply a high pressure, high velocity gas stream to assist the atomization of the relatively low velocity, low pressure liquid fuel stream issuing from the fuel nozzle during startup. However, the disadvantage of the air assist atomizer approach is the need for an external supply of high pressure air, such as by way of stored air from an air flask or the use of a separately powered air compressor. These requirements virtually eliminate the air assist atomizer for use in aircraft applications. Moreover, where the source of air is limited in volume, such as where air flasks are employed, the limited supply of air is used only during startup and is not utilized in the fuel atomization process during normal turbine operation.

Air blast atomizers have also been employed for the atomization of fuel to drive gas turbines. They are similar in some aspects to air assist atomizers, but unlike the latter they generally employ low pressure, low velocity air and they operate during the turbine operation, rather than at startup. Air blast atomizers have found widespread use in aircraft and marine, as well as industrial gas turbines because they enjoy several advantages over the pure simplex nozzle atomizers and the air assist atomizers. They can utilize lower fuel pump pressures, produce a finer spray and a more thorough mixing of the air and fuel, thereby resulting in a more efficient burn of the fuel, reduced soot formation, relatively lower flame radiation and a minimum of exhaust smoke.

Although the air blast atomizers enjoy a number of advantages in turbine operation, they typically suffer the disadvantage that they are incapable of startup without the use of ancillary equipment or procedures curing conditions of low fuel and air pressure such as exists at the low turbine rpm startup conditions. One such provision which attempts to overcome this problem is the use of a "piloted" or "hybrid" atomizer in which a typical prefilming air blast atomizer is provided with an additional fuel circuit having a simplex nozzle designed simply to provide fuel which has been mechanically atomized without air assist at the low pressure startup conditions to initiate ignition. Once ignition has been initiated, another fuel atomizing system is utilized to provide the atomized fuel during the normal turbine operation and the role of the simplex nozzle becomes insignificant during normal operation. Thus, again in these "piloted" or "hybrid" atomizers, special fuel circuits and nozzles are needed which have little if any functional use or purpose during normal turbine operation.

In the present invention, a simplex airblast fuel injection system and method for the atomization of fuel for ignition to drive a gas turbine overcomes the several aforementioned disadvantages. In the system and method of the present invention the need for separate fuel circuits and nozzles which are only functional during turbine startup is avoided, as well as the additional expense, number of parts, reduced reliability and increased complexity which accompanies the use of such additional fuel circuits and nozzles. In the system and method of the present invention the need for additional sources of high pressure, high velocity air as in the air assist atomizers is also avoided. Thus, the system and method of the present invention are readily adapted to use in aircraft and marine turbines and have been found to be particularly well suited for use in small gas turbine engines which are battery started. In the system and method of the present invention the components thereof operatively function, both during the normal operation of the gas turbine, as well as during its startup, without the need to provide special components which are functional during only one of the last mentioned conditions and not the other.

It has been discovered in the present invention that a single simplex fuel nozzle and fuel supply system may be utilized during both startup and normal operation in conjunction with very low pressure, high volume air supplied by a turbine driven compressor during startup to achieve sufficient atomization to initiate ignition of the fuel. At the extremely low fuel pressures which exist at startup, a film is discharged from the nozzle orifice which by itself is incapable of atomization sufficient to initiate ignition. However, it has been discovered that if a swirling motion is imparted to the very low pressure, high volume air generated by the compressor at the low cranking speed rpm which exists under startup conditions, and this swirling air is directed toward the film so as to produce a vortex adjacent to the film as it issues from the nozzle orifice, a pressure differential can be established between the opposite sides of the film which is sufficient to explode the film to result in atomization sufficient to initiate ignition of the fuel. This discover is surprising because it was not previously thought that the very low pressure, high volume air which exists at the low rpm cranking speeds was useful for this purpose. Hence recourse was previously made to the air assist principle with its high pressure, low volume air for fuel atomization during startup.

In one principal aspect of the present invention, a simplex air blast fuel injection system for the atomization of fuel for ignition to drive a gas turbine includes a simplex nozzle having an orifice and the nozzle is sized and constructed to produce a swirling stream of atomized fuel issuing from its orifice between maximum and minimum fuel pressures during the operation of the turbine. Fuel supply means supplies the fuel to the nozzle at pressures between the maximum and minimum fuel pressures during the turbine operation, and also supplies fuel to the nozzle during startup of the turbine, but at a pressure which is substantially lower than the minimum fuel pressure to form a fuel film issuing from the nozzle orifice which is insufficiently atomized to permit initiation of ignition. Air supply means supplies air at a low pressure and high volume to the fuel issuing from the nozzle orifice during both turbine startup and operation. Air directing means imparts a swirling motion to the low pressure, high volume air and directs the swirling air toward the fuel film as it issues from the orifice during startup of the turbine to explode and atomize the film sufficiently to permit initiation of ignition.

In another principal aspect of the system of the present invention, the aforementioned air supply means comprises a compressor powered by the turbine.

In still another principal aspect of the system of the present invention, the aforementioned fuel supply means includes a fuel pump powered by the turbine.

In still another principal aspect of the system of the present invention, the aforementioned air directing means also directs air at low pressure and high volume to the swirling stream of atomized fuel issuing from the orifice during turbine operation.

In still another principal aspect of the present invention, a method of atomizing fuel for ignition of the fuel to drive a gas turbine during startup includes supplying the fuel to a simplex nozzle at a substantially low pressure to form a film issuing from the orifice of the nozzle which is insufficiently atomized to initiate ignition; imparting a swirling motion to a stream of low pressure, high volume air; and directing the swirling stream of air toward the fuel film as it issues from the nozzle to explode and atomize the fuel in the film sufficiently to permit initiation of ignition during turbine startup.

In still another principal aspect of the present invention, a method of atomizing fuel for ignition to drive a gas turbine includes supplying fuel to a simplex nozzle from a fuel supply at a range of pressures between maximum and minimum during the operation of the turbine, and at a substantially lower pressure than the minimum fuel pressure during turbine startup; discharging the fuel from the nozzle as a swirling stream of atomized fuel during turbine operation, and during turbine startup as a film which is insufficiently atomized to initiate ignition; imparting a swirling motion to a stream of low pressure, high volume air; and directing the swirling stream of air toward the fuel film as it issues from the nozzle to explode and atomize the fuel film sufficiently to permit initiation of ignition during turbine startup.

In still another principal aspect of the method of the invention, the stream of low pressure, high volume air is also directed to the swirling stream of atomized fuel during turbine operation.

In still another principal aspect of the method of the invention, the fuel film is also swirling as it is discharged from the nozzle.

In still another principal aspect of the method of the invention, the direction of rotation of the swirling stream of air and fuel film are cocurrent.

These and other objects, features and advantages of the present invention will be more clearly understood upon consideration of the detailed description of the preferred embodiment of the invention which will be described to follow.

BRIEF DESCRIPTION OF THE DRAWING

In the course of this description reference will frequently be made to the attached drawing in which the sole figure is a schematic, cross sectioned elevation view of a fuel injector and system constructed in accordance with the principles of the present invention and which practice the method of the present invention.

DESCRIPTION OF THE PREFERRED EMBODIMENT

In the drawing a preferred embodiment of air blast fuel injector is shown which includes a simplex fuel nozzle generally 10. The simplex nozzle 10 comprises a body 12 which defines a cavity 14 therein. A fuel inlet passage 16 passes through the rear wall 18 of the body 12 and a machined distributor insert 20 is positioned in the cavity 14 and rests against an annular shoulder 22 therein The distributor insert 20 is preferably held in place against the shoulder 22 by a nozzle tip 24 which is attached to an inner wall 26 of the cavity 14 as by threading or the like (not shown).

The distributor insert 20 includes one or more bored passages 28 to permit passage of the fuel, as shown by the arrows, through the rear of the distributor insert 20 to a first intermediate chamber 30 defined by the walls of the insert 20 and the interior wall of cavity 14. Passages 32 adjacent the front of the insert 20 permit fuel to pass from the intermediate chamber 30 to a second intermediate chamber 34 between a front face 38 of the insert and a rear face 36 of the nozzle tip 24.

The front face 38 of the distributor insert 20 includes an annular projection 40 having at least one, and preferably a plurality, of slotted openings 42 spaced around its circumference and opening tangentially into a swirl chamber 44 in the nozzle tip 24. The swirl chamber 44 is generally frustoconical in shape and at its narrower forward end terminates in an orifice 46 for discharging the fuel from the simplex nozzle. Because the slotted openings 42 enter the swirl chamber 44 in a tangential fashion, a swirling motion is imparted to the fuel in the swirl chamber as depicted by the arrows shown therein in the drawing, and the fuel stream which leaves the orifice 46 has a swirling motion to it. It will be understood that the slotted openings may take a form other than slots without departing from the invention.

The construction and sizing of the elements of the simplex nozzle 10 are selected to produce a swirling stream of fuel issuing from the orifice 46 over the range of fuel pressures between the maximum and minimum fuel pressures and turndown ratios which would be encountered by the nozzle over its full turbine operating range. The fuel is supplied to the simplex nozzle 10 by a fuel pump 48 which is driven by the turbine 50 during normal operation of the turbine, and also when the turbine is being cranked during startup. A flow control valve 52 is positioned in the fuel line between the fuel pump 48 and the simplex nozzle 10 to control the fuel flow rate and pressure, and the turndown ratio of fuel, between its maximum and minimum pressures and over the range of operation of the turbine 50.

The body 12 of the simplex nozzle 10 is surrounded by an air director shroud, generally 54. The shroud 54 comprises a casing 56 having angularly disposed vanes 58 positioned within the casing between the casing and the nozzle body 12 to impart a swirling motion to the air which enters the casing 56. The casing 56 includes a front deflector portion 60 which extends inwardly and angularly toward the nozzle orifice 46 as shown in the drawing. The deflector portion 60, together with the nozzle body 12 and front face 62 of the nozzle tip 24, define an air chamber and passage 64 downstream of the vanes 58 which receive and discharge the swirling air from the vanes 58 toward the fuel adjacent its point of discharge from the orifice 46. This swirling air creates a vortex of air as shown by the arrows A about the fuel stream as will be discussed in more detail to follow.

One or more additional air director shrouds 66 having angularly disposed vanes 68 may also surround the air director shroud 54 to supply additional air during turbine operation. In the preferred embodiment of the present invention the additional air director shrouds 66 do not play a principal role in the atomization of the fuel during startup. They have a functional effect primarily only during normal turbine operation to supply additional air to the discharged fuel. It is the air director shroud 54 which performs the principal role in atomization of the fuel during startup as will be described further in the description of operation to follow.

The air director shrouds 54 and 66 together with the simplex nozzle 10 are mounted as an assembly in an opening 70 in the turbine combustor wall 72. Low pressure, low velocity, high volume air is supplied to the air director shrouds 54 and 66 and their vanes 58 and 68 by a compressor 74 which is also driven by the turbine 50, both during normal operation and during cranking in the startup phase. The compressor 74 discharges its air to a plenum 76 which is located to the left of the air director shrouds 54 and 66 and the turbine combustor wall 72, as viewed in the drawing. The vanes 58 and 68 communicate with the plenum to permit passage of the air through the vanes and air director shrouds.

DESCRIPTION OF OPERATION

When the turbine 50 is in its shutdown condition, the fuel and air pressures in the overall system are essentially at ambient conditions.

To commence startup the turbine is cranked at low rpm by a suitable motor and power source, such as a battery. During cranking, the fuel pump 48 and air compressor 74 are also cranked at low rpm as they are driven off the turbine 50 while it is being cranked at low rpm. At these low cranking speeds, the fuel pump 48 will deliver some fuel to the simplex nozzle 10. However, because the simplex nozzle 10 is constructed and sized to operate over the much higher range of fuel operating pressures and flow rates up to the maximum during operation of the turbine and due to the low rpm of the fuel pump, the fuel pressure developed in the nozzle by the fuel pump at these low cranking speeds will be extremely low, e.g. on the order of 5 psig or less.

This extremely low pressure fuel will enter the nozzle through the fuel inlet passage 16 to fill the cavity 14, and will pass through the fuel passages 28 into the first intermediate chamber 30, through the passages 32 to the second intermediate chamber 34, and through the slots 42 into the swirl chamber 44. Although some swirl is imparted to this fuel by the slots 42, the extremely low pressures of the fuel will be inadequate to develop a sufficient degree of atomization of the fuel which issues from the orifice 46 to initiate ignition of the fuel. At these low pressures, the fuel will issue from the orifice 46 either as a swirling bubble 78 as generally shown dotted in the drawing with the swirling motion as depicted by the arrow F, or as a somewhat open ended swirling tulip shape 80, as also generally shown in dotted. These shapes generally define a film which without further assistance does not result in sufficient atomization of the fuel to permit ignition of the fuel.

It has been discovered in the present invention that if the very low pressure and velocity but high volume air which is generated by the compressor 74 during the low cranking speeds of the turbine 50 can be induced to swirl and this swirling air can be properly directed to this film, a threshold pressure differential between the outside and inside of the film bubble 78 or tulip 80 will occur which will cause the film to explode and break up, and will sufficiently atomize it so that it can initiate and support ignition.

As shown in the drawing, the very low pressure and velocity but high volume air produced by the compressor 74 passes through the air plenum 76 and the air director shroud 54 and its vanes 58. The vanes 58 impart a swirl to the air and this swirling air passes through the chamber and passage 64 and is directed to the film bubble 78 or tulip 80 at a location adjacent its origin as it issues from orifice 46. It has been found that this swirling air which is at an extremely low pressure of one inch of water, and may even be as little as 0.7 inch of water, is still sufficient to create a vortex about the film bubble adjacent its origin. This vortex results in a lowering of the pressure about the film bubble and sets up a pressure differential between the opposite sides of the film bubble or tulip. The differential pressure causes the bubble or tulip to deform from its original configuration shown in dotted in the drawing to that shown in solid, and causes the bubble or tulip to explode into sufficiently fine droplets which assume the enlarged hollow conical shape as shown in solid in the drawing to initiate ignition of the droplets. It is preferred that the directions of rotation of the vortex formed by the swirling air A and of the fuel F film bubble be cocurrent. However, they may also be countercurrent.

Once ignition occurs, the turbine will come up to its normal operating speed at which time the fuel pressure supplied by the pump 48 and the air pressure supplied by the compressor 74 will increase. The speed of the turbine 50 now can be controlled over its operating range by adjusting valve 52 to achieve fuel pressures and flow rates between maximums and minimums over the range of turbine operation.

It will be seen from the foregoing that the simplex nozzle 10 in the system and method of the present invention is capable of functioning not only over the entire operating range of the turbine 50, but will also function during low turbine rpm startup conditions. Thus, multiple nozzles and fuel circuits are avoided with their attendant disadvantages. Moreover, the need for high air pressure sources as in air assist atomizers is obviated together with their disadvantages. Once the turbine 50 is in operation, low pressure, high volume air continues to be supplied through the air director shroud 54, and this air may also be supplemented through the additional air director shrouds 66 in the present invention thereby operating as an airblast atomizer during normal turbine operation with its attendant advantages as earlier outlined.

It will be understood that the preferred embodiment of the present invention which has been described is merely illustrative of the principles of the present invention. Numerous modifications may be made by those skilled in the art without departing from the true spirit and scope of the invention.

We claim:

1. An airblast fuel injection system for the atomization of fuel for ignition to drive a gas turbine, comprising:

a nozzle having an orifice, said nozzle being sized and constructed to produce a stream of atomized fuel issuing form its orifice at least at a minimum fuel pressure during the operation of the turbine;

fuel supply means for supplying the fuel to said nozzle at least at said minimum fuel pressure during the turbine operation, said fuel supply means also supplying fuel to the same nozzle during startup of the turbine but at a pressure which is substantially lower than said minimum fuel pressure to form a fuel film issuing from said nozzle orifice which is insufficiently atomized to permit initiation of ignition;

air supply means for supplying air at least at a minimum pressure to the fuel issuing from said nozzle orifice during turbine operation and at a pressure substantially lower than said minimum pressure during turbine startup; and air directing means for imparting a swirling motion to said substantially lower pressure air from said air supply means and directing the swirling air toward said insufficiently atomized fuel film as it issues from said orifice during startup of the turbine to explode and atomize the film sufficiently to permit initiation of ignition.

2. The system of claim 1, wherein said air supply means comprises a compressor powered by the turbine.

3. The system of 2, wherein said air directing means also directs air at said minimum pressure to the stream of atomized fuel issuing from said orifice during turbine operation.

4. The system of claim 2, wherein said fuel supply means includes a fuel pump powered by the turbine.

5. The system of claim 1, wherein said air directing means also directs air at said minimum pressure to the stream of atomized fuel issuing from said orifice during turbine operation.

6. The system of claim 1, wherein said fuel supply means includes a fuel pump powered by the turbine.

7. The system of claim 1, wherein said nozzle is sized and constructed to impart a swirling motion to said stream of atomized fuel during turbine operation.

8. The system of claim 1, wherein said nozzle is sized and constructed to also impart swirl to said insufficiently atomized fuel film during turbine startup.

9. The system of claim 8, wherein said air directing means imparts a swirling motion to said substantially lower pressure air which is cocurrent to the swirling motion of the insufficiently atomized fuel film.

10. The system of claim 8, wherein said nozzle is sized and constructed to impart a swirling motion to said stream of atomized fuel during turbine operation.

11. The system of claim 7, wherein said air directing means also directs air to said swirling stream of atomized fuel during turbine operation.

12. The system of claim 11, wherein said last mentioned stream of air is also swirling.

13. The system of claim 1, wherein said nozzle is a simplex nozzle.

* * * * *